May 27, 1958 J. S. TJADEN 2,836,194
VALVE
Filed Jan. 18, 1957

INVENTOR.
JAMES S. TJADEN
BY M. A. Hobbs
ATTORNEY

United States Patent Office 2,836,194
Patented May 27, 1958

2,836,194

VALVE

James S. Tjaden, Niles, Mich., assignor to Koontz-Wagner Electric Co., Inc., South Bend, Ind., a corporation of Indiana Application January 18, 1957, Serial No. 634,889

6 Claims. (Cl. 137—599.2)

The present invention relates to a valve and more particularly to a valve having an emergency by-pass.

In engine fuel systems for certain vehicles, such as tanks and other heavy off-road equipment, a solenoid operated valve is employed to shut off the fuel line when the engine is not in operation. In these valves the valve element is normally moved to open position and held in said position by the solenoid and is moved to and held in closed position by a spring. Since the valve element automatically closes whenever the solenoid current is interrupted for any reason, the valves are usually adapted to be manually operated or provided with a manually controlled by-pass around the valve element, to assure operation of the valve in the event of power failure to the solenoid. One of the principal objects of the present invention is to provide a valve of the aforesaid type having a manually operated control which is automatically rendered ineffective when the solenoid is operated and will remain ineffective until it is again manually operated.

Another object of the invention is to provide a solenoid controlled by-pass which is automatically closed when the main valve element is opened by the solenoid and remains closed until again manually opened.

Still another object of the invention is to provide an easily operated, dependable over-ride mechanism for a solenoid operated valve.

A further object is to provide in an electrically operated valve a manual control valve which will remain open only when set in its maximum open position.

Additional objects and advantages will become apparent from the following description and accompanying drawing, wherein:

Figure 1 is a longitudinal cross sectional view of my valve mechanism, showing the valve elements in their closed positions;

Figure 2 is a longitudinal cross sectional view of the valve elements, showing one of the elements in open position and the other in closed position; and Figure 3 is a fragmentary cross sectional view of the valve mechanism, showing one of the valve elements in open position and the other in closed position, opposite to that shown in Figure 2.

Referring more specifically to the drawing, numeral 10 designates a valve body having an inlet passage and chamber 12 and 14 and an outlet passage and chamber 16 and 18, said chambers being connected by a port 20 defined by an annular valve seat 22. The inlet and outlet passages are threaded to receive threaded fittings of the fluid line in which the valve is assembled. Holes 24 and 26 are also provided through the valve body for mounting the valve on a suitable fixture or other supporting member.

Port 20 is controlled by a main valve element 28 consisting of a hollow cylindrical plunger 29 having an annular gasket 30 of rubber or rubber like material supported on an annular rib 32 formed integrally with the plunger. The main valve element is moved to open position by a solenoid 34, the plunger 36 of which is connected to the valve element by a stem 38 threaded into the end thereof. The threaded connection between plunger 36 and stem 38 permits an adjustment of the stroke of the plunger between the valve closed position and the valve wide open position, the movement of the plunger in the valve opening direction being limited by member 40 rigidly mounted in the end of the solenoid. After the proper valve stroke adjustment has been made by rotating plunger 36 relative to stem 38 the setting is maintained by staking the threaded portion at point 42 in the side of the plunger. The valve is moved to closed position, and held in closed position when the solenoid is de-energized, by a coil spring 43 seated in a recess 44 in one end of plunger 36 and in a recess 46 in the adjacent end of member 40. Valve element 28 is also urged toward closed position and firmly seated on valve seat 22 by the differential pressure between chambers 14 and 18 across said valve element.

For the purpose of the present description, solenoid 34 may be considered a conventional or standard unit consisting of a coil 48 and bobbin 50 enclosed in a cylindrical shell 52 threaded into the end of valve body 10, as shown at numeral 54, and staked in its assembled position by a pin 56. A gasket 57 seated in an annular recess 62 forms a fluid tight seal between the shell and valve body. The electrical circuit for operating the solenoid is connected to the coil through a terminal assembly 58 of standard construction.

In order to permit operation of the valve in the event of power failure to the solenoid, a by-pass around or through the main valve element is provided, consisting of a plurality of ports 70 connecting chamber 14 with the cylindrical passage 72 formed in the hollow interior of plunger 29. Passage 72 opens at the end of plunger 36 into chamber 14 and is controlled by a valve element 74 which seats onto the end of said plunger and projects into the end of the passage. The portion 75 of the valve element contacting the end of the plunger is constructed of rubber or the like to form an effective seal when the element is seated. A guide and retainer 76 for valve element 74 is threaded onto the end of plunger 29 and contains a plurality of holes 78 to permit the fluid to flow from passage 72 when element 74 is withdrawn from the end of the plunger. Valve element 74 is operated manually by a knob 80 through a linkage 82 consisting of a stem 84 joined integrally to valve element 74 and extending through the end of retainer 76 and a shaft 86 joined at one end to stem 84 by a connection 88 and carrying on the other end knob 80 which is secured thereto by a pin 90. Shaft 86 is supported by a cylindrical plug 92 threaded into the end of body 10 and sealed therein by an O-ring 94 disposed in an annular groove 96, and the shaft is sealed in the plug by gaskets 98 and 99 which permit the shaft to move endwise therethrough without fluid seepage. After the plug has been rotated into the desired position in the body by use of a wrench in recesses 100 it is staked at point 102. Connection 88 consists of bifurcated prong 104 on the end of shaft 86 for seating into a groove 106 near the free end of stem 84. The construction of the connection permits the valve stem to be easily connected to shaft 86 when the valve parts are being assembled and permits the valve elements to adjust themselves readily to their seats during the operation of the valve.

Once valve element 74 has been moved to its fully opened position by the operator manually pulling the knob outwardly, the valve is held in its wide open position by a ring-shaped permanent magnet 110 holding a disc-shaped keeper 112 against the forward edges of top and bottom magnet poles 114 and 116, respectively, said keeper being mounted on shaft 86 and held against axial movement thereon by connection 88 on one side and a ring 118 on the other side. When the keeper, which is of magnetic attractable metal, is pulled into contact with poles 114 and 116 it remains there until it is forceably removed either by the operator pushing the knob inwardly or by the operation of the solenoid, as will be more fully explained hereinafter. With the keeper in contact with the poles, as shown in Figure 3, a closed magnetic circuit is formed. When the keeper has been disengaged from the poles, a coil spring 120 reacting between the inner face of plug 92 and adjacent side of the keeper returns the valve to its closed position and holds it in closed position until again manually opened. The spring, however, is not of sufficient strength to dislodge the keeper from the magnet poles.

In the operation of the valve in a fuel line of a vehicle, solenoid 34 normally controls the valve and the by-pass valve element 74 remains fully closed regardless of whether main valve element 28 is open or closed. When the solenoid is energized, plunger 36 is moved to the right, as seen in the drawing, pulling main valve element 28 to its fully open position, the extent to which the valve element will open depending upon the space provided between plunger 36 and member 40. The main valve element is retained in its fully opened position as long as the solenoid is energized and is promptly moved to fully closed position by spring 43 when the solenoid is de-energized. When main valve element 28 is open, fluid, such as gasoline, flows from inlet passage 12 through chamber 14, port 20 and chamber 18 and from the valve through outlet passage 16.

In the event the solenoid fails, main valve element 28 closes and remains closed cutting off the flow of fuel through port 20. In this emergency the operator can obtain the desired flow through the valve by pulling knob 80 outwardly, moving valve element 74 from its closed position shown in Figure 1 to its fully opened position shown in Figure 3. When the valve element reaches its fully opened position, keeper 112 engages poles 114 and 116 and is held in that position by magnet 110, thereby retaining the valve element in its open position. The fluid now by-passes the main valve element by flowing from chamber 14 through ports 70, passage 72, past valve 74 and through ports 78 into chamber 18.

Valve element 74 remains open until the solenoid is re-energized or until knob 80 is pushed inwardly by the operator. When the solenoid is energized while valve element 74 is open, plunger 29 moves to the right, carrying retainer 76 with it, causing the closed end of the retainer to engage the back side of valve element 74 and move said element to the right and keeper away from the poles 114 and 116. Dislodgement of the keeper from the poles permits spring 120 to move valve element 74 to its normally closed position where it remains until it is again manually opened by the operator. Dislodgement of the keeper from the poles by the operator pushing knob 80 inwardly also permits spring 120 to close valve element 74 and hold it in closed position.

One of the principal advantages of the present valve is that the by-pass can be fully manually controlled and is automatically rendered inoperative when the electrical operating means of the valve becomes inoperative. This permits manual operation of the valve during power failure and the subsequent over-riding of the manual control by the electrical control without further attention from the vehicle operator. Hence if there is insufficient power to operate the solenoid when the engine of a tank, for example, is being started, the operator can manually open the valve to obtain fuel to start and run the engine which then generates sufficient current to operate the solenoid automatically opening the main valve element and rendering the manually controlled by-pass inoperative, for normal operation of the valve.

While only one embodiment of the present invention is illustrated herein, various modifications and changes may be made without departing from the scope of the present invention. For example, the by-pass may be at the side of the main valve element rather than in or through said element, the magnet and keeper may be of various shapes and constructions, the positions of the magnet and keeper may be interchanged, and other types of mechanisms such as hydraulic or vacuum devices can be substituted for the solenoid for operating the main valve element. Further, for some uses the magnetic valve holding mechanism may be used in connection with the main valve element or with any other independent or single valve element.

I claim:

1. A valve comprising a body having means defining a fluid inlet chamber and a fluid outlet chamber, means defining a port connecting said chambers, a main valve element for controlling the flow of fluid through said port, a solenoid for opening said valve element, spring for closing said valve element, a passage through said valve element connecting said chambers, a valve element for controlling the flow of fluid through said last mentioned passage, a longitudinally movable shaft adapted to be manually operated for opening said last mentioned valve element, a ring shaped magnetic means mounted rigidly in said body around said shaft, a disc shaped magnetic attractable metal keeper mounted rigidly on said shaft and adapted to be attracted to said magnetic means for holding said last mentioned valve element in fully open position, a spring means for urging said last mentioned valve element toward closed position, and a means operated by said solenoid for disengaging said keeper from said magnetic means.

2. A valve comprising a body having a fluid inlet passage and a fluid outlet passage, means defining a port connecting said passages, a main valve element for closing said port, a solenoid for opening said valve element, spring for closing said valve element, a by-pass conduit connecting said passages, a valve element for closing said conduit, a longitudinally movable shaft adapted to be manually operated for opening said last mentioned valve element, a ring shaped magnetic means mounted in said body around said shaft, a disc shaped member mounted on and secured to said shaft and adapted to be attracted to said magnetic means for holding said last mentioned valve element in open position, a spring means for urging said last mentioned valve element toward closed position, and a means operated by said solenoid for moving said member from said magnetic means.

3. A valve comprising a body having a fluid inlet passage and a fluid outlet passage, means defining a port connecting said passages, a main valve element for closing said port, a means for opening said valve element, yieldable means for closing said valve element, a by-pass conduit connecting said passages, a valve element for closing said conduit, a manually movable shaft for opening said last mentioned valve element, magnetic means mounted in said body, a member mounted on and secured to said shaft and adapted to be attracted to said magnetic means for holding said last mentioned valve element in open position, a spring means for urging said last mentioned valve element toward closed position, and a means operated by said first valve operating means for moving said member from said magnetic means.

4. A valve comprising a body having a fluid inlet chamber and a fluid outlet chamber, means defining a port connecting said chambers, a main valve element for controlling the flow of fluid through said port, a solenoid for opening said valve element, spring for closing said valve element, a passage through said valve element connecting said chambers, a valve element for controlling the flow of fluid through said passage, a manually movable means for opening said last mentioned valve element, a permanent magnet means for holding said last mentioned valve element only in fully open position, spring means for urging said last mentioned valve element toward closed position, and means operated by said solenoid for moving said last mentioned valve element toward closed position.

5. A valve comprising a body having a fluid inlet passage and a fluid outlet passage, means defining a port connecting said passages, a main valve element for closing said port, a means for opening said valve element, yieldable means for closing said valve element, a bypass conduit connecting said passages, a valve element for closing said conduit, a manually movable means for opening said last mentioned valve element, a permanent magnetic means for holding said last mentioned valve element only in fully open position, spring means for urging said last mentioned valve element toward closed position, and means operated by said first mentioned valve element operating means for moving said last mentioned valve element toward closed position.

6. In a valve, a fluid inlet passage and a fluid outlet passage, means defining a port connecting said passages, a main valve element for closing said port, an electrical means for opening said valve element, yieldable means for closing said valve element, a conduit coaxial with said port connecting said passages, a valve element coaxial with said first mentioned valve element for closing said conduit, a longitudinally movable shaft adapted to be manually operated for opening said last mentioned valve element, a ring shaped magnetic means mounted rigidly in the valve around said shaft, a disc shaped magnetic attractable metal keeper mounted on said shaft and adapted to be attracted to said magnetic means for holding said last mentioned valve element in open position, a spring means for urging said last mentioned valve toward closed position, and a means operated by said electrical means for moving said keeper from said magnetic means.

References Cited in the file of this patent

UNITED STATES PATENTS

| | | |
|---|---|---|
| 1,392,632 | Flanders | Oct. 4, 1921 |
| 1,501,303 | Berry | July 15, 1924 |
| 2,588,674 | Denberg | Mar. 11, 1952 |
| 2,723,681 | MacGlashan | Nov. 15, 1955 |